United States Patent [19]
Horikawa et al.

[11] Patent Number: 5,809,031
[45] Date of Patent: Sep. 15, 1998

[54] APPARATUS OF STUFF SYNCHRONIZATION FRAME CONTROL

[75] Inventors: Kiyotaka Horikawa; Tsutomu Nozaki, both of Tokyo, Japan

[73] Assignee: NEC Corporation, Tokyo, Japan

[21] Appl. No.: 716,732

[22] Filed: Sep. 23, 1996

[30] Foreign Application Priority Data

Sep. 26, 1995 [JP] Japan .................................. 7-247692

[51] Int. Cl.$^6$ ...................................................... H04J 3/06
[52] U.S. Cl. ............................................................ 370/506
[58] Field of Search ................................... 370/503, 505, 370/506, 509, 510, 512, 514; 375/354, 356, 363; 455/502

[56] References Cited

U.S. PATENT DOCUMENTS

| 4,920,547 | 4/1990 | Murakami | 370/506 |
| 5,426,643 | 6/1995 | Smolinske et al. | 370/506 |
| 5,638,411 | 6/1997 | Oikawa | 370/505 |

OTHER PUBLICATIONS

Research & Development Center for Radio System in Japan, RCR standard 27C, 2–123–125.

*Primary Examiner*—Chi H. Pham
*Assistant Examiner*—Richard Bo
*Attorney, Agent, or Firm*—Young & Thompson

[57] ABSTRACT

The present invention provides an apparatus of stuff synchronization frame control which can realize great improvement in the power of error resistance of the stuff synchronization control bit when there occur so many erroneous stuff synchronization control bits that cannot be repaired even by the majority process in a radio section. Radio-side and network-side clocks from the clock counters 11 and 12 are compared by the comparator 13, and the comparison result is inputted into the register 14. On an entry of a new stuff synchronization control bit into the register 14, the stuff synchronization control bit in the frame immediately before the entry is stored in the register 15. The multiplexer 16 multiplexes the stuff synchronization control bit together with transmission data for transmission. The separator 21 receives the data separated from the received data, in the received data buffer 22. When the result obtained by majority processing the stuff synchronization control bit in the frame in question has become unfixed, the comparator 23 switches the selector 25 to control the address counter 26 by means of the output from the comparator 24 which the stuff synchronization control bit in the frame immediately after the switching, has entered. The transmission timing to the network side and the reception timing from the radio side are absorbed by the elastic store memory 27.

6 Claims, 3 Drawing Sheets

5,809,031

APPARATUS OF STUFF SYNCHRONIZATION FRAME CONTROL

BACKGROUND OF THE INVENTION

1. Field of the Invention

The present invention relates to an apparatus of stuff synchronization frame control, and more particularly, to an apparatus of stuff synchronization frame control for data communication in a mobile communication system having asynchronous data interfaces between a network side (a communication network composed by mobile communication switching offices and radio base station controllers) and a radio base station side, recommended in the standard of RCR-STD27C (Research & Development Center for Radio System in Japan, RCR standard 27C).

2. Description of the Related Art

FIG. 3 is a block diagram showing an example of conventional apparatus of stuff synchronization frame control, and FIG. 4 is a view showing a structural example of the data frame in FIG. 3.

Referring to FIG. 3, according to the conventional apparatus of stuff synchronization frame control, a transmission unit for transmitting a data signal from a network side to a radio base station comprises a BCH coding unit 31, an interleave memory 32 for scrambling the data, and a stuff synchronization control unit 33 for determining the clock difference between a network-side clock and a radio-side clock to generate stuff synchronization control bits.

A reception unit for receiving a data signal from the radio base station side comprises a de-interleave memory 34 for unscrambling the data thus scrambled from the radio base station side, and a BCH decoding unit 35 for correcting an error. A stuff synchronization control unit 33 extracts effective data bits from a reception frame by means of the stuff synchronization control bits received.

A frame control unit 36 generates and separates a data frame shown in FIG. 4 (The Standard of RCR-STD27C).

Referring to FIG. 4, the structure of data frame consists of 73 lines and each line has 15 bits (73 lines×15 bits), and each line is composed of data (such as "ABCD" and "EFGH") of four bits as standard from the network side, and check eleven bits added thereto.

The fourth bit of the 60th line, and the first bit of the 61st line are stuff synchronization bit 401 respectively, and the second and third bits (hatched in the figure) of the 61st line to the 67th line are stuff synchronization control bits 402 respectively.

Also, the fourth bit of the 61st line, and the first and fourth bits of the 62nd line to the 67th line are fixedly "1" respectively, and further each of the information of 4 bits for the 68th line to the 73rd line is a dummy bit area, and is all "1".

In this respect, data are transmitted in the order of bit A, B, C, D, E, F, . . . from the network side, and the order of transmission to the radio base station side is ①, ②, ③ . . . according to the number of line.

The operation of this conventional example will be described with reference to FIGS. 3 and 4.

First, on the transmission side, data from the network side is added with redundant bits of 11 bits (check 11 bits) for every four bits of information in the BCH coding unit 31, and is scrambled by the interleave memory 32 in order to cope with a burst-like error in a radio section.

During this period of time, in order to determine the number of data to be placed on the data frame shown in FIG. 4, the stuff synchronization control unit 33 counts the number of the network-side clock pulses while the radio-side clock makes 240 counts, and after generating stuff synchronization control bits (2 bits represent 239/240/241 respectively) 402 on the basis of the result, transmits seven same ones from the 61st line to the 67th line.

Next, on the reception side, the data received from the radio base station side through the frame control unit 36 is unscrambled by a de-interleave memory 34, and any erroneous bits are corrected by a BCH decoding unit 35.

At this time, the stuff synchronization control unit 33 further performs a majority decision process on the basis of the stuff synchronization bits thus reproduced, and extracts any effective data bits from the reception frame in accordance with the result to transmit them to the network side.

In the conventional apparatus of stuff synchronization frame control, should there occur, in the radio section, so many erroneous stuff synchronization control bits that cannot be determined even by the majority decision process, there was the problem that any frame mounted with effective data of 239 or 241 bits thereon cannot be reproduced within the transmission frame because the number of effective data within the frame is unconditionally set to 240 bits on the reception side in such a case.

Also, there was the problem that the occurrence of a large number of such erroneous frames is likely to cause overflow to the reception buffer or to cause the elastic store memory to be exhausted.

SUMMARY OF THE INVENTION

It is an object of the present invention to provide, in data communication in a mobile communication system, recommended in the standard of RCR-STD27C, having data interfaces with a network side and a radio base station side, which operate asynchronously, an apparatus of stuff synchronization frame control in which the power of error resistance for the stuff synchronization control bit has been strengthened, by allocating the stuff synchronization control bit in the transmission frame immediately before the entry of a new bit, in an area which has been used as a conventional dummy bit for a data frame in a radio section to thereby divide it into two frames and transmit the stuff synchronization control bit doubly.

According to the present invention, in an apparatus of stuff synchronization frame control for data communication in a mobile communication system having data interfaces with a network side and a radio base station side, which operate asynchronously, there can be obtained the apparatus of stuff synchronization frame control characterized by comprising: a stuff synchronization control bit transmission unit for transmitting a stuff synchronization control bit doubled in units of frames; and a stuff synchronization control bit receiving unit for determining, when the result of a majority decision process for the stuff synchronization control bit for the frame in question has become unfixed, a number of effective bits for received data by a stuff synchronization control bit for the next frame.

Also, there can be obtained the apparatus of stuff synchronization frame control characterized by comprising:

the stuff synchronization control bit transmission unit which is composed of: a first clock counter for counting a radio-side clock which becomes a reference clock; a second clock counter for counting a network-side clock through a fixed period of the first clock counter; a first comparator for comparing an output clock from the first clock counter with that from the second clock counter; a first register for temporarily storing the comparison result of the first comparator; a second register for shifting, on an entry of a new stuff synchronization control bit into the first register, a stuff synchronization control bit in a frame immediately before the entry, which has been therein until then, for storing: and a multiplexer for multiplexing stuff synchronization control bits from the first and second registers together with transmission data to output them to a BCH coding unit, and the stuff synchronization control bit receiving unit which is composed of: a separator for separating the data received from the BCH decoding unit into data and stuff synchronization control bit; a received data buffer for temporarily storing the data thus separated; a second comparator for majority processing the stuff synchronization control bit in the frame in question separated by the separator; a third comparator in which the stuff synchronization control bit in the aforesaid next frame has entered; a selector for switching to the third comparator when the process result by the second comparator has become unfixed; and an address counter for determining a number of effective bits of the aforesaid received data by the output of the third comparator thus switched.

BRIEF DESCRIPTION OF THE DRAWINGS

FIG. 1(a) shows the stuff synchronization control bit transmission unit, and FIG. 1(b) shows the stuff synchronization control bit receiving unit.

DETAILED DESCRIPTION OF THE PREFERRED EMBODIMENTS

The present invention will be described in the following by referring to the attached drawings.

Figure 1A:
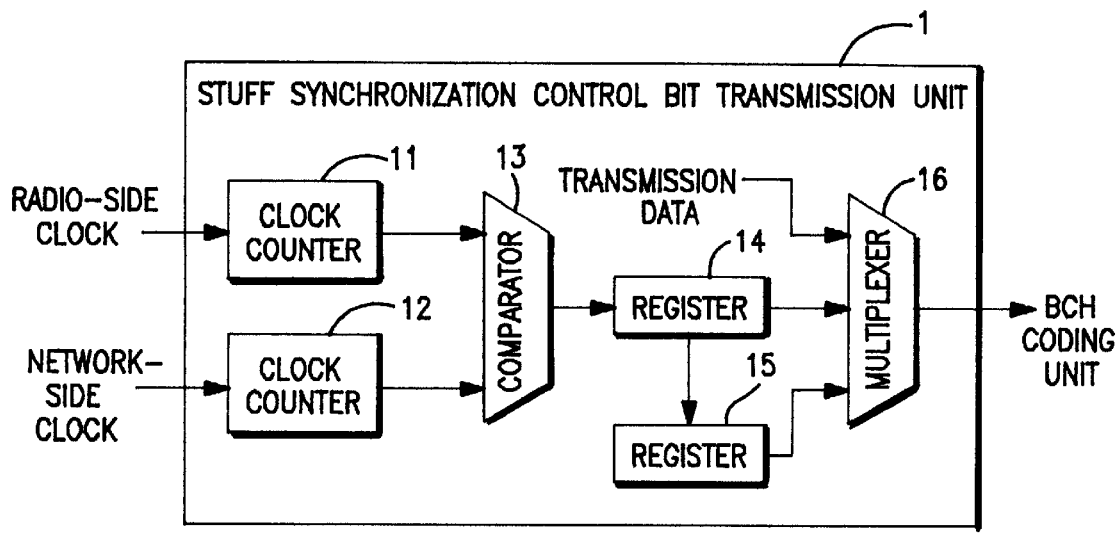
FIGS. 1(a) and 1(b) are block diagrams showing an embodiment of an apparatus of stuff synchronization frame control according to the present invention.
Figure 1B:
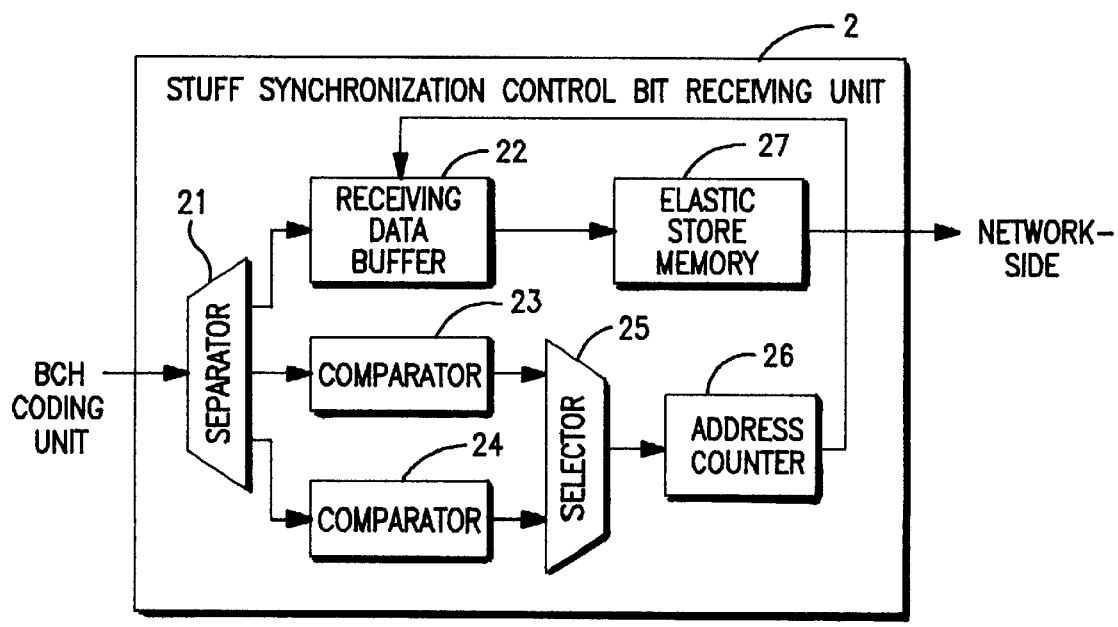
Figure 2:
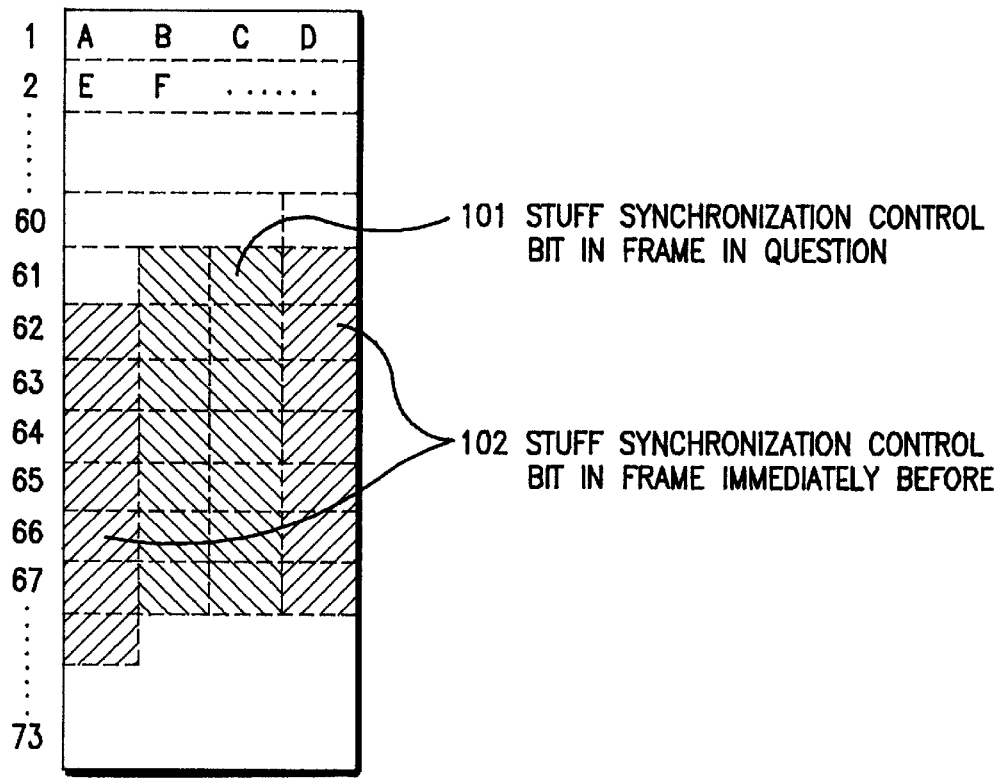
FIG. 2 is a view showing a structural example of the data frame in FIGS. 1(a) and 1(b).
Figure 3:
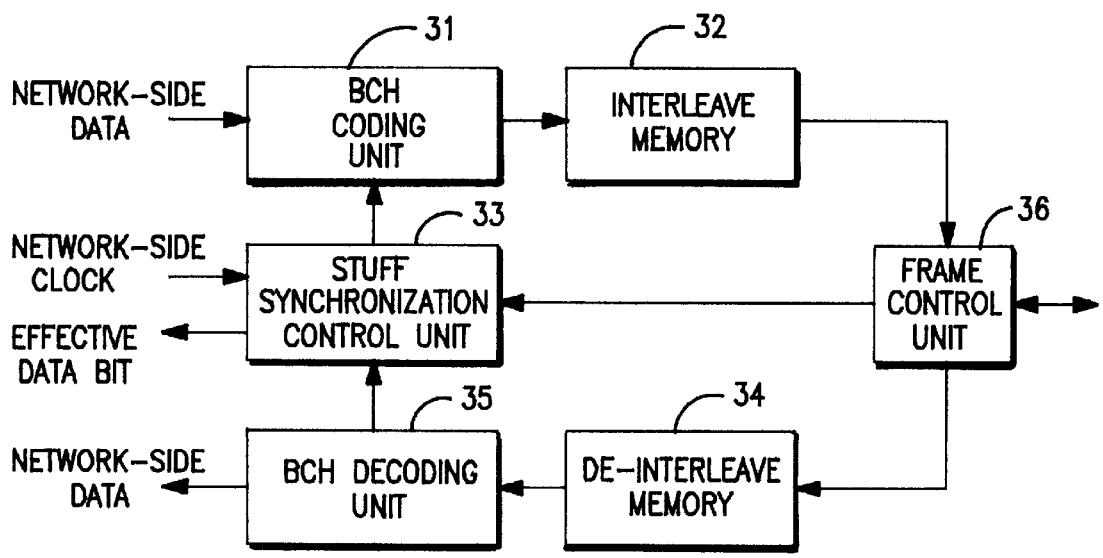
FIG. 3 is a block diagram showing one example of the conventional stuff synchronization system.
Figure 4:
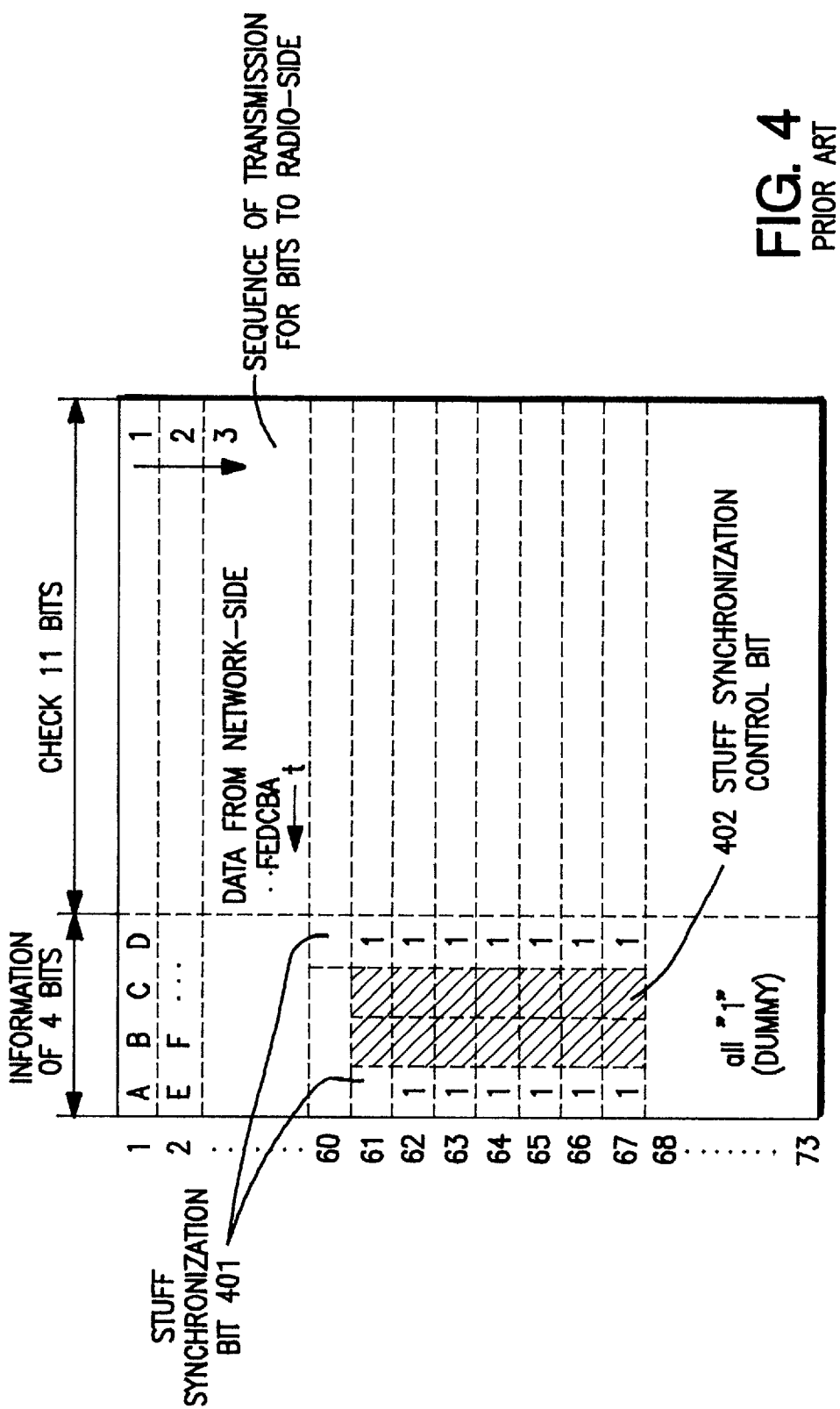
FIG. 4 is a view showing a structural example of a data frame in FIG. 3.

FIGS. 1(a) and 1(b) are block diagrams showing an embodiment of an apparatus of stuff synchronization frame control according to the present invention. FIG. 1(a) shows the stuff synchronization control bit transmission unit, and FIG. 1(b) shows the stuff synchronization control bit receiving unit. FIG. 2 is a view showing a structural example of the data frame in FIGS. 1(a) and 1(b).

First, referring to FIG. 1(a), the stuff synchronization control bit transmission unit 1 comprises clock counters 11 and 12, a comparator 13, registers 14 and 15, and a multiplexer 15.

The clock counter 11 counts a radio-side clock which becomes a reference clock, the clock counter 12 counts a network-side clock through a fixed period of the clock counter 11, and the comparator 13 compares an output clock from the clock counter 11 with that from the clock counter 12 to temporarily store the comparison result in a register 14. On an entry of a new stuff synchronization control bit into the register 14, it shifts the stuff synchronization control bit 102 in a frame immediately before the entry, which has been therein until then, for storing in the register 15. The multiplexer 16 multiplexes the stuff synchronization bits from the registers 14 and 15 together with transmission data, and generates a data frame shown in FIG. 2 to transmit them to the BCH coding unit.

Next, referring to FIG. 1(b), the stuff synchronization control bit receiving unit 2 comprises a separator 21, a received data buffer 22, comparators 23 and 24, a selector 25, an address counter 26, and an elastic store memory 27.

The separator 21 separates data received from the BCH decoding unit into data and stuff synchronization control bit to temporarily store the data thus separated in the received data buffer 22. On the other hand, the comparator 23 performs majority decision processes an the stuff synchronization control bit 101 in the frame in question separated by the separator 21, and controls the address counter 26 according to the result to determine the number of effective bits for the received data. When, however, the result by the comparator 23 has become nonconclusive, the selector 25 is switched to control the address counter 26 by means of the stuff synchronization control bit in the frame immediately after the switching, which has been in the comparator 24. In this respect, transmission timing to the network side and reception timing from the radio side are started in the elastic store memory 27.

As described above, the apparatus of stuff synchronization frame control according to the present invention can provide great improvement in the power of error resistance of the stuff synchronization control bit.

Assuming the total number of received frames per unit time to be m, the number of frames which could be reproduced to be n, and a number of times at which reproduction could not be made over one or a plurality of frames per unit time to be p respectively, the present invention is capable of improving the error resistance rate for stuff synchronization control bit to $0 \leq (n+p)/m \leq 1$ while the conventional error resistance rate was $0 \leq n/m \leq 1$.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therin.

What is claimed is:

1. An apparatus of stuff synchronization frame control for data communication in a mobile communication system having data interfaces with a network side and a radio base station side, which operate asynchronously, said apparatus comprising:

a stuff synchronization control bit transmission unit for transmitting two kinds of stuff synchronization control bits in a present data frame, each identifying a number of effective bits of data to be transmitted in a respective data frame; and a stuff synchronization control bit receiving unit for determining applicable stuff synchronization control bits in said present data frame by selecting one of said two kinds of stuff synchronization control bits, and for extracting said effective bits of data being received, based on said determined applicable stuff synchronization control bits.

2. The apparatus of stuff synchronization frame control according to claim 1, wherein said stuff synchronization control bit transmission unit transmits a plurality of sets of each of said two kinds of stuff synchronization control bits, said stuff synchronization control bit receiving unit determining said applicable stuff synchronization control bits in said data frame by tracking a majority of said plurality of sets of said stuff synchronization control bits being received and having an identical bit pattern.

3. The apparatus of stuff synchronization frame control according to claim 2, wherein said two kinds of stuff synchronization control bits are stuff synchronization control bits for the present data frame and stuff synchronization control bits for a previous data frame, said stuff synchronization control bit receiving unit using said stuff synchronization control bits for the present data frame as said applicable stuff synchronization control bits, unless said stuff synchronization control bits for the present data frame cannot be determined.

4. The apparatus of stuff synchronization frame control according to claim 3, wherein said stuff synchronization control bit receiving unit uses said stuff synchronization control bits for the previous data frame as said applicable stuff synchronization control bits, when the stuff synchronization control bits for the present data frame cannot be determined.

5. An apparatus of stuff synchronization frame control for data communication in a mobile communication system having a data interface with a network side and a radio base station side, which operate asynchronously, said apparatus comprising:

a stuff synchronization control bit transmission unit including:

a first clock counter for counting a radio-side clock speed, said radio-side clock serving as a reference clock;

a second clock counter for counting a network-side clock speed through a fixed period of said first clock counter;

a first comparator for comparing said network-side clock speed with said radio-side clock speed;

a first register for storing first stuff synchronization control bits in accordance with the comparison in said first comparator;

a second register for storing contents previously in said first register as second stuff synchronization control bits upon storage of new stuff synchronization control bits in said first register; and a multiplexer for multiplexing the first stuff synchronization control bits from said first register and the second stuff synchronization control bits from said second register together with data to be transmitted; and a stuff synchronization control bit receiving unit including:

a separator for separating a received data frame into received data and received first and second stuff synchronization control bits;

a receiving data buffer for temporarily storing said separated received data;

a second comparator for determining stuff synchronization control bits to be used in the data frame by recognizing the received first stuff synchronization control bits separated by said separator;

a third comparator for determining stuff synchronization control bits to be used alternatively in the data frame by recognizing the received second stuff synchronization control bits separated by said separator;

an address counter for determining a number of effective bits of said received data in accordance with said stuff synchronization control bits to be used in the data frame; and a selector for changing from connection between said address counter and said second comparator to connection between said address counter and said third comparator, when said stuff synchronization control bits to be used in the data frame cannot be determined by said second comparator.

6. The apparatus of stuff synchronization frame control according to claim 5, wherein said multiplexer in said stuff synchronization control bit transmission unit multiplexes a plurality of sets of each of said first and second stuff synchronization control bits, each of said second and third comparators in said stuff synchronization control bit receiving unit determining said stuff synchronization control bits to be used in said data frame by tracking a majority of a plurality of sets of stuff synchronization control bits being received and having an identical bit pattern.

* * * * *